United States Patent
Curington et al.

(10) Patent No.: US 10,019,649 B2
(45) Date of Patent: Jul. 10, 2018

(54) POINT CLOUD SIMPLIFICATION

(71) Applicant: VISUAL TECHNOLOGY SERVICES LIMITED, Berkshire (GB)

(72) Inventors: Ian Curington, Berkshire (GB); Evgeny Panasyuk, Rostov-On-Don (RU)

(73) Assignee: VISUAL TECHNOLOGY SERVICES LIMITED, Berkshire (GB)

( * ) Notice: Subject to any disclaimer, the term of this patent is extended or adjusted under 35 U.S.C. 154(b) by 431 days.

(21) Appl. No.: 14/577,625

(22) Filed: Dec. 19, 2014

(65) Prior Publication Data
US 2015/0178594 A1    Jun. 25, 2015

(30) Foreign Application Priority Data

Dec. 20, 2013   (GB) .................................. 1322711.1

(51) Int. Cl.
*G06K 9/00* (2006.01)
*G06K 9/62* (2006.01)
*G06K 9/46* (2006.01)

(52) U.S. Cl.
CPC ........ *G06K 9/6219* (2013.01); *G06K 9/00201* (2013.01); *G06K 9/469* (2013.01)

(58) Field of Classification Search
None
See application file for complete search history.

(56) References Cited

U.S. PATENT DOCUMENTS

| 2013/0060775 A1* | 3/2013 | Qiu .................. G06F 19/24 707/737 |
| 2013/0335406 A1* | 12/2013 | Tabellion .............. G06T 17/005 345/419 |
| 2014/0089834 A1* | 3/2014 | Marder-Eppstein .. G06F 3/0484 715/771 |
| 2014/0160123 A1* | 6/2014 | Yang ...................... G06T 17/00 345/420 |

FOREIGN PATENT DOCUMENTS

WO        2013/123636 A1    8/2013

OTHER PUBLICATIONS

Oct. 30, 2015 Extended European Search Report issued in European Patent Application No. 14195530.2.
(Continued)

*Primary Examiner* — Vikkram Bali
(74) *Attorney, Agent, or Firm* — Kenealy Vaidya LLP (57) ABSTRACT

Some embodiments are directed to a computer implemented method for simplification of a point cloud including a set of points. The method comprises implementing recursive spatial partitioning of the set of points into a hierarchy of clusters, identifying representative points within each cluster in the hierarchy and, for each representative point, defining a point-pair that consists of or includes the representative point and a representative point of an immediate parent cluster. The method further includes calculating a contraction error metric for each point-pair, and iteratively contracting the point-pair with the lowest contraction error metric, updating remaining point-pairs as a result of the contraction, and revising the contraction error metric of the updated point-pairs accordingly.

16 Claims, 11 Drawing Sheets

(56) References Cited

OTHER PUBLICATIONS

M. Pauly, et al., "Multiresolution Modeling of Point-Sampled Geometry," Swiss Federal Institute of Technology, Computer Science Department, Institute of Visual Computing, Computer Graphics Lab CGL, Sep. 16, 2002.
M.Garland et al., "A Multiphase Approach to Efficient Surface Simplification," University of Illinois at Urbana-Champaign, IEEE Visualization, pp. 117-124, 2002.
M. Pauly, et al., "Efficient Simplification of Point-Sampled Surfaces," IEEE Visualization, pp. 163-170, 2002.
M.Garland et al., "Hierarchical Face Clustering on Polygonal Surfaces", Proceedings of the 2001 symposium on Interactive 3D graphics, pp. 49-58. 2001.
M.Garland et al., "Surface Simplification Using Quadric Error Metrics", Proceedings of the 24th annual conference on Computer graphics and interactive techniques, pp. 209-216, 1997.
Wikipedia Article, "Hierarchical clustering" —Wikipedia, retrieved from URL: "http://en.wikipedia.org/w/index.php?title=Hierarchical_clustering&oldid=597207577", on Oct. 6, 2015.
The Search Report for GB1322711.1 dated Sep. 12, 2014.
Office Action dated Apr. 6, 2018 to European Patent Application No. 14195530.2.
H. Song et al., "A global clustering approach to point cloud simplification with a specified data reduction ratio", Computer Aided Design, Elsevier Publishers BV., Barking, GB, vol. 40, No. 3, Nov. 5, 2007 (Nov. 5, 2007), pp. 281-292.

\* cited by examiner

Figure 3a $RP_n$ = representative point(s) of cluster $C_n$

| colspan="2" | $RP_1$-$RP_2$ | colspan="6" | $RP_1$-$RP_3$ | | |
|---|---|---|---|---|---|---|---|---|---|
| colspan="1" | $RP_2$-$RP_4$ | $RP_2$-$RP_5$ | colspan="3" | $RP_3$-$RP_6$ | $RP_3$-$RP_7$ | colspan="2" | $RP_3$-$RP_8$ | |
| $RP_4$-$RP_9$ | $RP_4$-$RP_{10}$ | $RP_5$-$RP_{11}$ | $RP_5$-$RP_{12}$ | $RP_6$-$RP_{13}$ | $RP_6$-$RP_{14}$ | $RP_6$-$RP_{15}$ | | $RP_8$-$RP_{16}$ | $RP_8$-$RP_{17}$ |

Figure 10

POINT CLOUD SIMPLIFICATION

FIELD

Some embodiments relate to methods and apparatus for simplification of a point cloud, wherein a point cloud includes a plurality of data points each of which is defined by a set of coordinates.

BACKGROUND

In recent years the use of LiDAR and laser scanning devices has become much more common, and the volume of data acquired by these devices has dramatically increased. In this regard, these scanning devices typically produce point cloud data that represents the three-dimensional (3D) surfaces and/or objects that have been scanned. A point cloud typically includes a massive data set that defines a large number of data points in some coordinate system. For example, a laser scan of a physical object will typically produce a data set that contains millions of data points, each specified by a 3-tuple using orthogonal coordinates that represent 3D space (e.g. x, y, z).

The processing, analysis and reporting of such large point cloud data sets can be difficult. In particular, it is often the case that the size of a point cloud data set exceeds the design and performance capabilities of the systems that need to make use of this data. Consequently, methods for reducing the size of point cloud data sets are an important pre-processing step in order to reduce the volume of data to a level suitable for consuming systems. The simplified/reduced point cloud data can then be more efficiently processed. In particular, simplifying point cloud data reduces the bandwidth required to transmit the point cloud data set across a network, reduces the amount of memory/storage space required to store the data set, and reduces the time required to process the data set (e.g. when being used in some form of practical application).

There are a number of related art approaches for simplifying point cloud data. However, these related art approaches either carry a significant risk of losing key features of the objects and/or surfaces represented by the data (e.g. sub-sampling decimation, uniform spatial clustering) or are complex to implement and therefore incur significantly more computational expense, requiring greater processing power/time (e.g. k-neighbours plane reconstruction).

SUMMARY

Some embodiments relate to a method of point cloud simplification (i.e. reducing the number of data points in a point cloud) that provides improved or enhanced sample selection, thereby preserving key features and minimizing or reducing distortions, whilst also being computationally efficient.

Therefore, according to a first aspect there is provided a computer implemented method for simplification of a point cloud that represents one or more three-dimensional surfaces or objects, the point cloud including a set of points. The method includes implementing recursive spatial partitioning of the set of points into a hierarchy of clusters, identifying representative points within each cluster in the hierarchy and, for each representative point, defining a point-pair that consists of or includes the representative point and a representative point of an immediate parent cluster. The method further includes calculating a contraction error metric for each point-pair, and iteratively contracting the point-pair with the lowest contraction error metric, updating remaining point-pairs as a result of the contraction, and revising the contraction error metric of the updated point-pairs accordingly.

The recursive spatial partitioning of the set of points into a hierarchy of clusters may include implementing divisive hierarchical clustering of the set of points. The recursive spatial partitioning of the set of points into a hierarchy of clusters may include partitioning an initial root cluster including the set of points into a number of clusters, and recursively partitioning each cluster into further clusters until either each cluster contains a single point or a predefined depth is reached.

The step of identifying representative points within each cluster in the hierarchy can include, for a branch cluster, identifying the point that is closest to the mean of the points within the cluster as a representative point, and, for a leaf cluster, identifying each point within the cluster as a representative point.

The method may further include generating a logical tree by defining the representative points as nodes of the logical tree, and, for each representative point, defining an edge of the logical tree as a point-pair that consists of or includes the representative point and a representative point of an immediate parent cluster.

The step of updating remaining point-pairs as a result of the contraction can include updating the logical tree as a result of the contraction of the point-pair.

The method may further include defining a contraction queue in which the point-pair with the lowest contraction error metric is first in the contraction queue and, after each contraction, updating the contraction queue to reflect updates in the calculated contraction error metrics of the updated point-pairs.

The step of updating remaining point-pairs as a result of the contraction may include identifying other point-pairs that include either of the points that were included in the contracted point-pair, and updating the identified point-pairs to include a new point generated as a result of the contraction.

The step of revising the contraction error metric of the updated point-pairs accordingly may include, for each of the point-pairs that are updated to include a new point generated as a result of the contraction, recalculating the contraction error metric using the new point.

The iterative contraction of the point-pair with the lowest contraction error metric can continue until a predefined stop criteria is met.

The contraction of the point-pair with the lowest contraction error metric may include replacing the point-pair with a new point. The step of replacing the point-pair with a new point can then include selecting a position of one of the points in the point-pair that results in the lowest contraction error metric for the corresponding contraction and generating a new point at the selected position. Alternatively, the step of replacing the point-pair with a new point can include determining a position that minimises the contraction error metric for the corresponding contraction and generating a new point at the determined position.

The contraction error metric may be the sum of the squared distances between a new point generated as a result of the contraction and each point in an affiliated set of points arising from the contraction of the point-pair. The contraction error metric may be calculated using a quadric error metric.

According to a second aspect there is provided a computer readable medium storing computer interpretable instructions which when interpreted by a programmable computer cause the computer to perform a method in accordance with the first aspect.

According to a third aspect there is provided a computer system for implementing simplification of a point cloud that represents one or more three-dimensional surfaces or objects, the point cloud including a set of points. The system includes a memory configured to store the point cloud, and a processor. The processor is configured to implement recursive spatial partitioning of the set of points into a hierarchy of clusters, to identify representative points within each cluster in the hierarchy and, for each representative point, to define a point-pair that consists of or includes the representative point and a representative point of an immediate parent cluster. The processor is further configured to calculate a contraction error metric for each point-pair, and to iteratively contract the point-pair with the lowest contraction error metric, updating remaining point-pairs as a result of the contraction, and revising the contraction error metric of the updated point-pairs accordingly.

BRIEF DESCRIPTION OF THE DRAWINGS

The present invention will now be more particularly described by way of example only with reference to the accompanying drawings, in which:

FIG. 3b illustrates schematically a tree representation of the representative points of each cluster in the cluster hierarchy of FIG. 3a;

FIG. 5b illustrates an example of pseudo-connectivity generated for the point cloud of FIG. 5a;

DETAILED DESCRIPTION OF THE EMBODIMENTS

Figure 1:
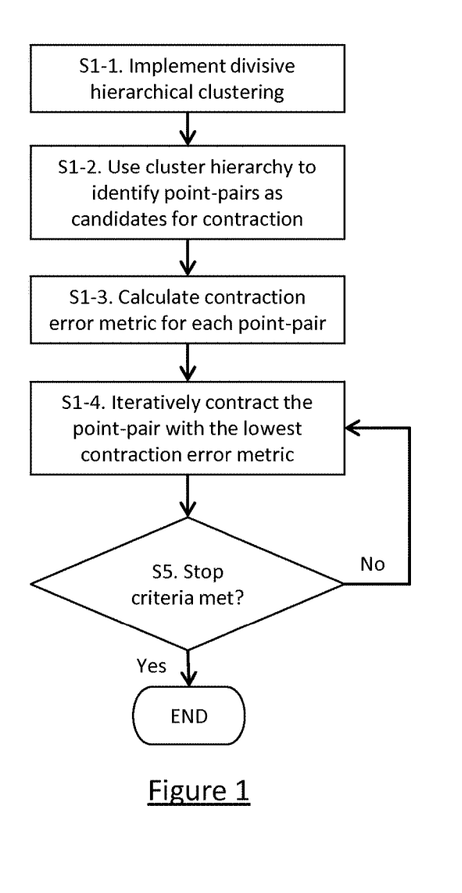
FIG. 1 is a flow diagram illustrating the method of point cloud simplification.

In order to at least mitigate the problems identified above there will now be described a method of point cloud simplification, wherein a point cloud includes a set of data points each of which is defined by a set of coordinates. FIG. 1 is a flow diagram illustrating the method of point cloud simplification. The method involves using divisive hierarchical clustering (S1) as means for identifying point-pairs (i.e. pairs of points) as candidates for contraction (S2), calculating a contraction error metric for each point-pair (S3), and iteratively contracting the point-pair with the lowest contraction error metric (S4). The iterative contraction of the point-pair with the lowest contraction error metric then continues until a predefined stop criteria is met (S5).

Figure 2:
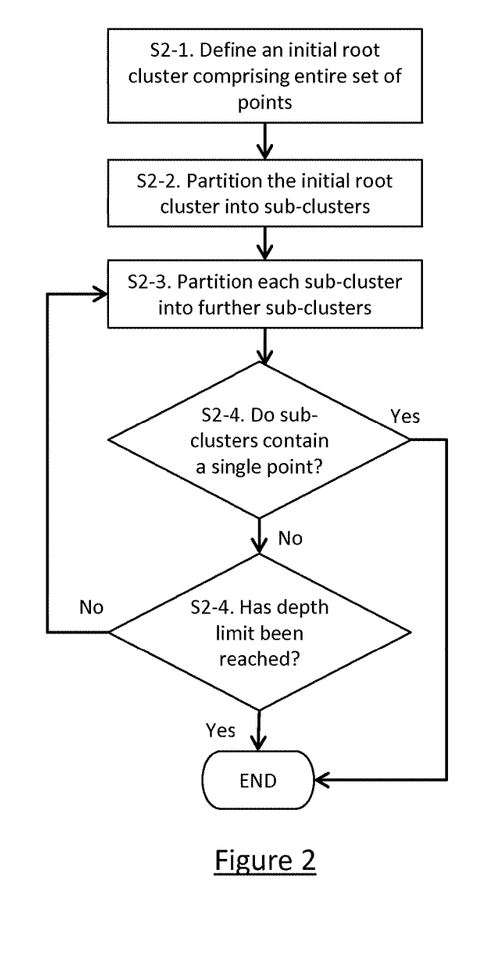
FIG. 2 is a flow diagram illustrating an exemplary process of recursive spatial partitioning of a set of points into a hierarchy of clusters.

In this regard, hierarchical clustering involves implementing recursive spatial partitioning of the set of points into a hierarchy of clusters. By way of example, FIG. 2 is a flow diagram illustrating an exemplary process of recursive spatial partitioning of a set of points into a hierarchy of clusters, which would typically involve defining the entire set of points as an initial root cluster (S2-1), partitioning the initial root cluster into a number of separate clusters (e.g. sub-clusters that each contain a subset of the points in the entire set) (S2-2), and recursively partitioning each cluster into further clusters (S2-3) until either a further cluster contains a single point (S2-4) or a predefined depth is reached (S2-5). This hierarchical clustering therefore recursively divides each cluster into smaller clusters containing fewer points.

Point-pairs can then be identified by identifying representative points within each cluster in the hierarchy and, for each representative point, defining a point-pair that consists of or includes the representative point and a representative point of an immediate parent cluster. In this regard, the representative point of a branch/internal cluster could be the point that is closest to the mean of the points within the cluster (i.e. a centre point of the cluster), whilst for a leaf/external cluster, each point within the cluster could be considered to be a representative point of that cluster. Consequently, where a branch/internal cluster is the immediate parent of multiple further clusters, then the representative point of that cluster will be included within multiple point-pairs of the point-pairs that are defined for the hierarchy of clusters. Conversely, each representative point within a leaf/external cluster will only be included within a single point-pair of the point-pairs that are defined for the hierarchy of clusters; however, each leaf/external cluster could include multiple representative points.

Figure 3A:
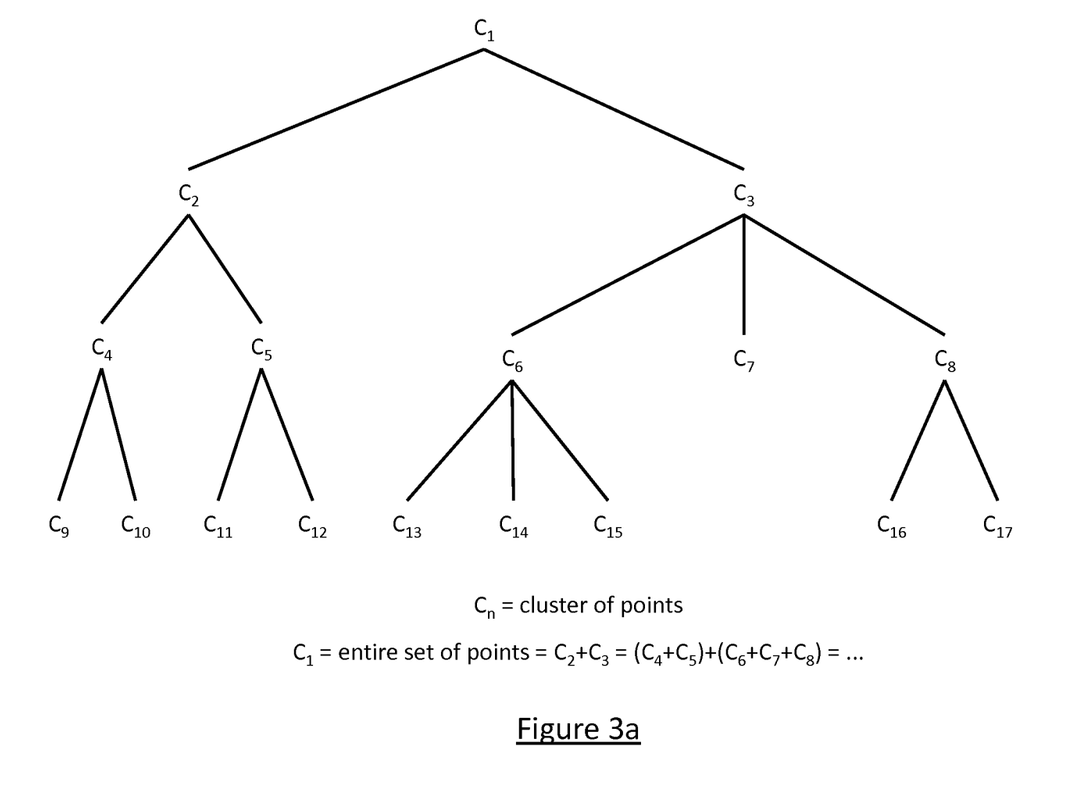
FIG. 3a illustrates schematically a tree representation of a simple example of a cluster hierarchy.
Figure 3B:
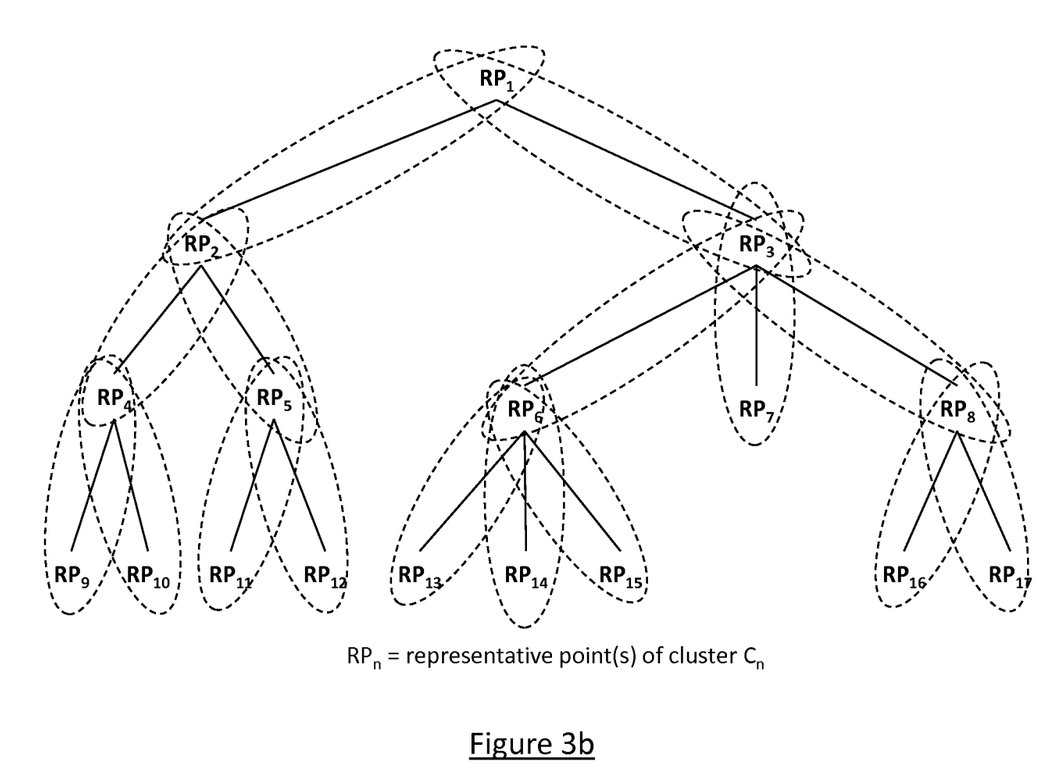
Figure 10:
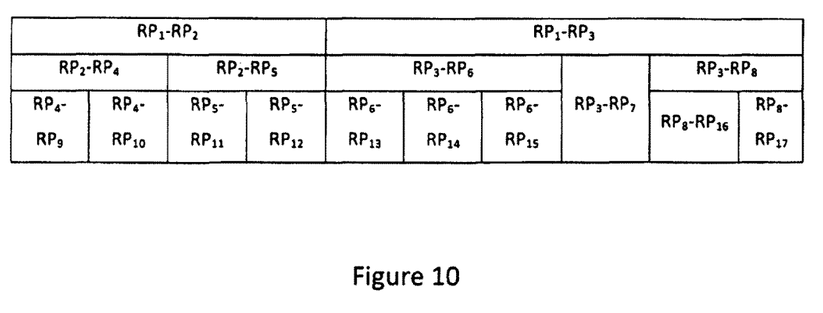
FIG. 10 is a chart of data relevant to FIG. 3b.

By way of example, FIG. 3a illustrates schematically a tree representation of a simple example of a cluster hierarchy formed as a result of divisive hierarchical clustering of a set of points. The initial root cluster ($C_1$) includes all of the points in the set to be simplified. Each sub-cluster ($C_2$ to $C_{17}$) then includes a subset of the points that are part of the initial root cluster ($C_1$). In FIG. 3b, the representative point(s) ($RP_n$) within each cluster ($C_n$) illustrated in FIG. 3a have been identified, and a point-pair has then been defined as the combination of each representative point with the representative point of the immediate parent cluster. To illustrate this, each of the point-pairs present in FIG. 3b are shown as encircled by a dashed line. The point-pairs of the example of FIG. 3b therefore include the data of FIG. 10.

It is noted that this example has assumed that each leaf/external cluster contains only a single representative point. However, if one or more of the leaf/external clusters includes more than one representative point, then further point-pairs would be defined. For example, if cluster $C_9$ were to contain two representative points (i.e. $RP_{9-1}$ and $RP_{9-2}$), then the point-pairs that are defined for the hierarchy of clusters would include both $RP_4$-$RP_{9-1}$ and $RP_4$-$RP_{9-2}$.

In addition, in the examples illustrated in FIGS. 3a and 3b, the divisive hierarchical clustering has resulted in a cluster hierarchy in which there are leaf/external clusters at different depths within the hierarchy, as leaf/external cluster $C_7$ occurs at a depth of 2 whilst the remaining leaf/external clusters occur at a depth of 3. This would occur if the divisive hierarchical clustering process resulted in cluster $C_7$ containing only a single point, such that there would be no further spatial partitioning of this cluster, whilst further spatial partitioning of the other clusters at that depth is still possible. For example, this could occur for parts of point cloud that are sparse relative to other parts. However, it is also possible that the divisive hierarchical clustering process would result in a cluster hierarchy in which the leaf/external clusters are all at the same depth within the hierarchy.

Once all of the point-pairs within the set of points have been identified (i.e. as candidates for contraction), then the contraction error metric of each point-pair is calculated. The contraction of the point-pair with the lowest contraction error metric then includes replacing both of the points in the point-pair with a new, replacement point. For example, the replacement point could either be located at the position of whichever one of the points in the point-pair to be contracted that results in the lowest contraction error metric for the corresponding contraction, or at a position that minimises the contraction error metric for the corresponding contraction.

Figure 4:
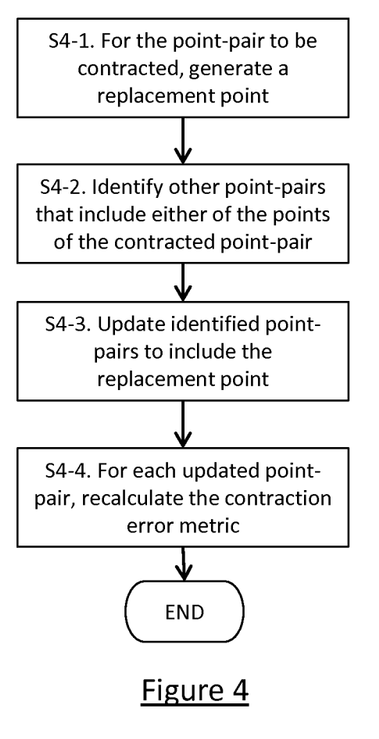
FIG. 4 is a flow diagram illustrating an example of a process that could occur for each point-pair contraction.

After each point-pair contraction, the remaining point-pairs are updated as a result of the contraction, and the contraction error metric of the updated point-pairs is then revised accordingly. By way of example, FIG. 4 is a flow diagram illustrating an example of a process that could occur for each point-pair contraction. For the point-pair to be contracted (i.e. the point-pair with the lowest contraction error metric), a replacement point is generated that will replace both points in the point-pair (S4-1). Then, in order to update the remaining point-pairs to reflect the result of the contraction, any other point-pairs that include either of the points that are included in the contracted point-pair are identified (S4-2), and these identified point-pairs are updated to include the replacement point generated as a result of the contraction (i.e. in place of the point that was involved in the contraction) (S4-3). Then, for each of the point-pairs that are updated to include the replacement point resulting from the contraction, the contraction error metric is recalculated using the replacement point (S4-4).

It should be noted that the process described above in relation to FIG. 4 is exemplary only. In particular, it is noted that the order steps of the process outlined above could be modified whilst achieving the same result. For example, the step of identifying other point-pairs that include either of the points that are included in the contracted point-pair could be implemented before the replacement point (i.e. that will result from the contraction) is generated.

Preferably, as a result of calculating the contraction error metric of each point-pair, a contraction priority queue is defined in which the point-pair with the lowest contraction error metric is first in the contraction priority queue. In this case, the contraction priority queue would then be updated after each contraction in order to reflect updates in the calculated contraction error metrics of the updated point-pairs, such that the point-pair with the lowest contraction error metric is again first in the contraction priority queue even if the contraction error metrics have changed as a result of the preceding contraction.

Consequently, the contraction priority queue should be implemented in such a way that it can be efficiently updated following changes to the calculated contraction error metrics of any updated point-pairs. By way of example, one possible way of achieving this would be to implement the contraction priority queue as a Fibonacci heap, which includes a collection of trees that satisfy the minimum-heap property. This results in O(N log(N)) overall complexity for average case (when each point is connected only to limited percent of all points). However, this is merely an example, and other methods could also be used to implement the contraction priority queue.

In addition, as this method is implemented in a computer, it is preferable that, following the hierarchical clustering, a logical tree is generated by identifying representative points within each cluster in the hierarchy, defining the representative points as nodes of the logical tree, and, for each representative point, defining an edge of the logical tree as a point-pair that consists of or includes the representative point and a representative point of an immediate parent cluster. In this regard, the tree representation of FIG. 3b effectively illustrates an example of a logical tree in which the nodes are the representative points ($RP_n$) of each cluster, and the edges include the point-pairs defined for the hierarchy, as illustrated by the lines connecting the representative points within each cluster with the representative point within it's immediate parent cluster.

Figure 5A:
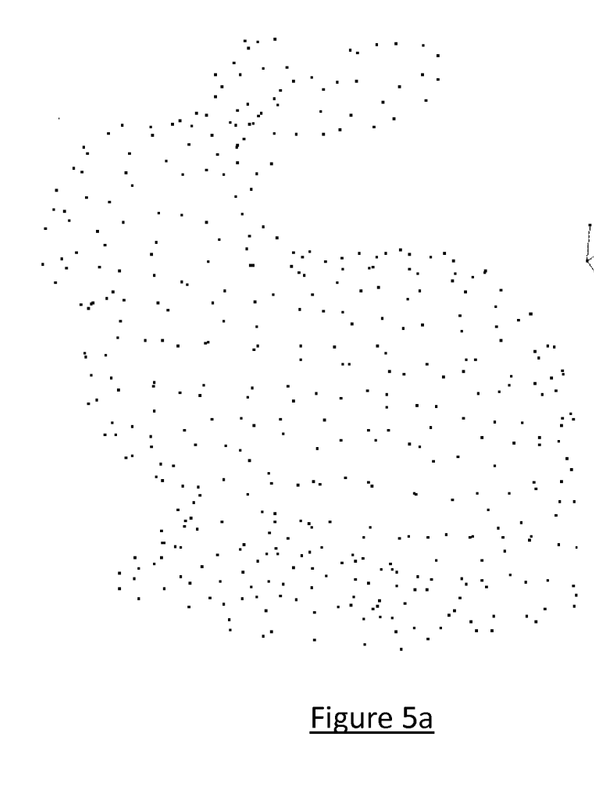
FIG. 5a illustrates an example of unprocessed point cloud representation.
Figure 5B:
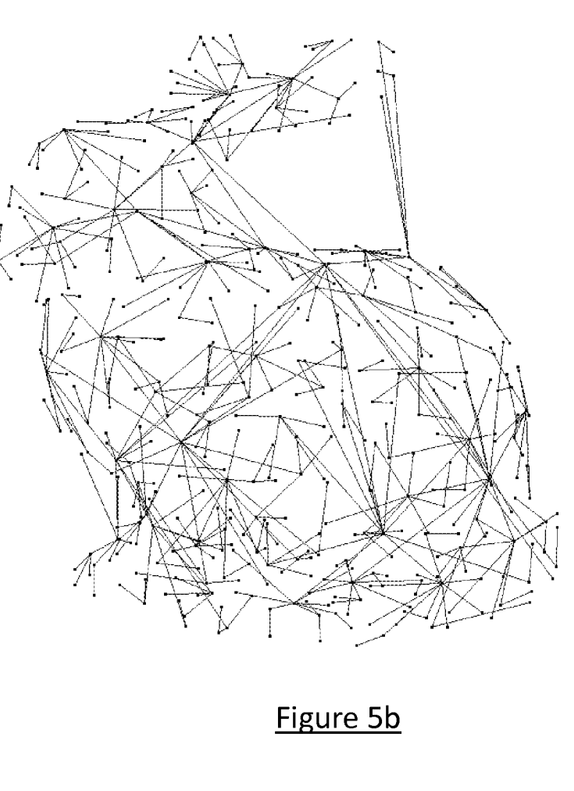

To further illustrate the logical tree generated by the methods described herein, FIG. 5a illustrates an unprocessed point cloud representation of the well-known Stanford bunny, and FIG. 5b then illustrates the pseudo-connectivity of the points of this point cloud generated when a logical tree is formed in accordance with the methods described herein.

Figure 6A:
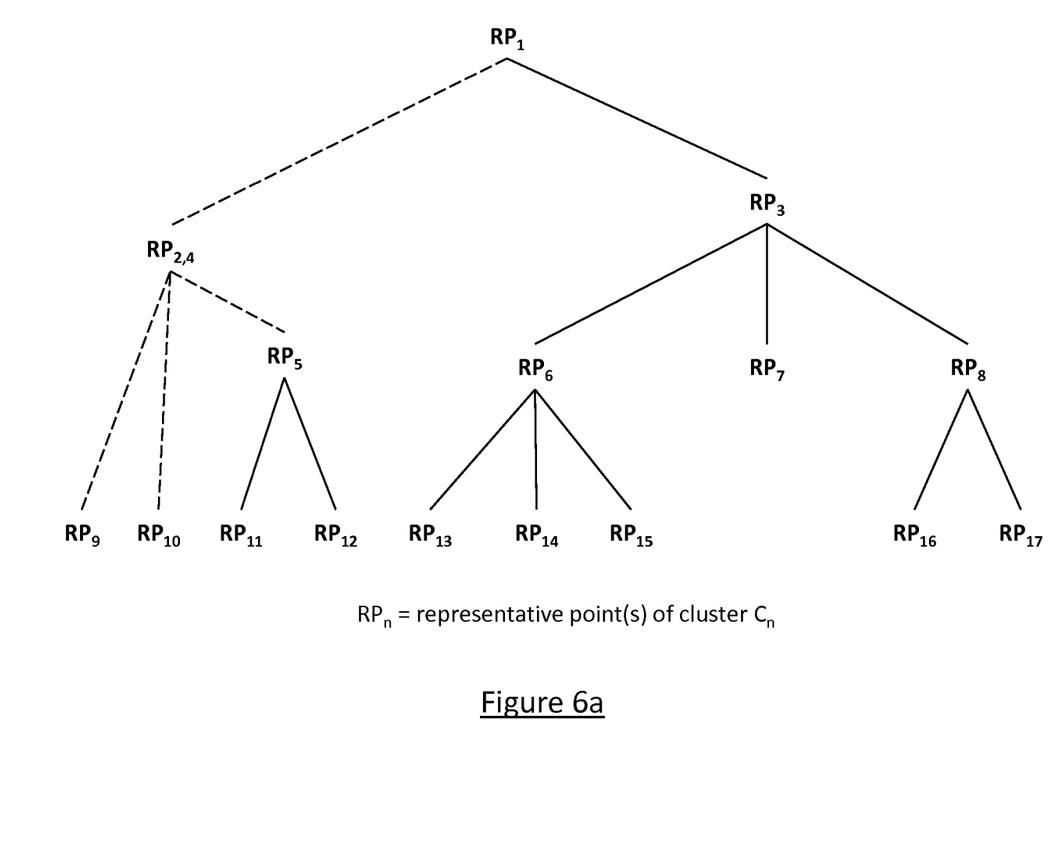
FIG. 6a illustrates a tree representation of the result of an exemplary first contraction of the tree illustrated in FIG. 3b.

When a logical tree is generated following the hierarchical clustering, after each point-pair contraction, the logical tree is updated as a result of the contraction of the point-pair such that the remaining point-pairs that are affected by the contraction reflect the result of the contraction. By way of example, FIG. 6a illustrates a tree representation of the result of an exemplary first contraction of point-pair $RP_2$-$RP_4$ of FIG. 3b. This example contraction results in a new, replacement point $RP_{2,4}$ that replaces both $RP_2$ and $RP_4$. Moreover, as a result of the contraction, the edges of the logical tree that involved either of $RP_2$ and $RP_4$ are updated to include replacement point $RP_{2,4}$ instead. This updating of the edges of the logical tree is illustrated by the dashed lines in FIG. 6a.

Figure 6B:
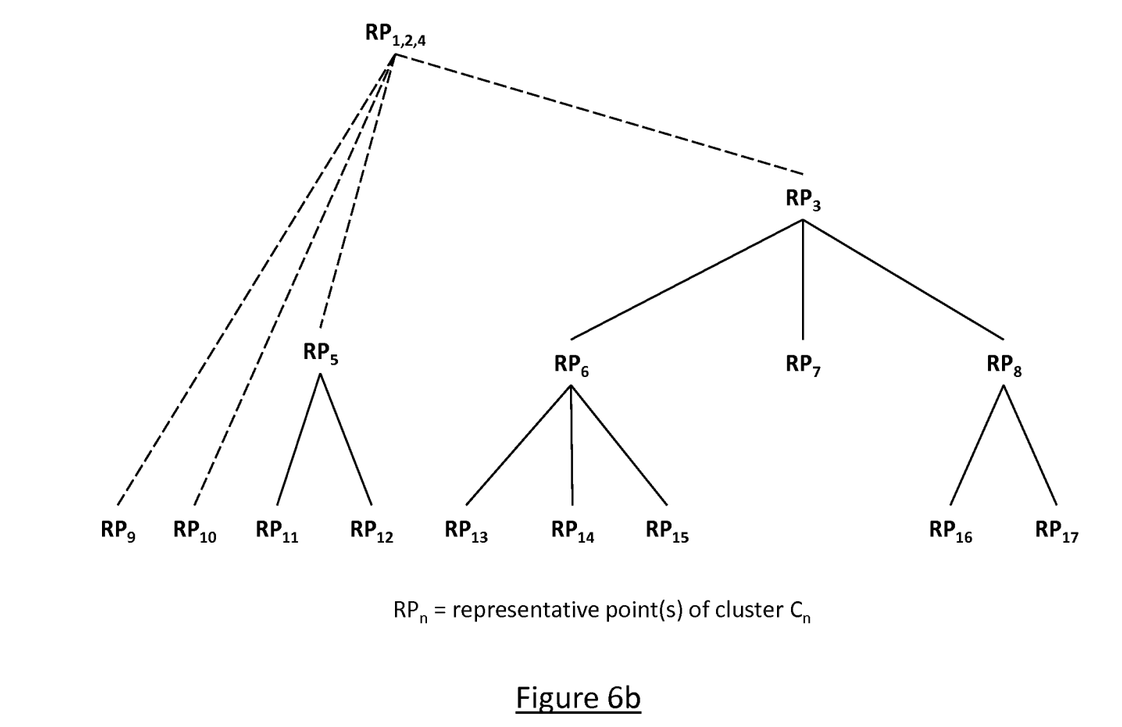
FIG. 6b illustrates a tree representation of the result of an exemplary second contraction of the tree illustrated in FIG. 3b.

FIG. 6b then illustrates a tree representation of the result of an exemplary second contraction of the tree illustrated in FIG. 3b. In this second contraction, the updated point pair $RP_1$-$RP_{2,4}$ resulting from the first contraction is contracted such that replacement point $RP_{1,2,4}$ replaces both $RP_1$ and $RP_{2,4}$ (which replaced $RP_2$ and $RP_4$). Once again, the edges of the logical tree that involved either of the points in the contracted point-pair (i.e. $RP_1$ and $RP_{2,4}$) are updated to include replacement point $RP_{1,2,4}$ instead. This updating of the edges of the logical tree is illustrated by the dashed lines in FIG. 6b.

The use of a logical tree including the representative points of each cluster within a cluster hierarchy (i.e. generated by the spatial hierarchal clustering of a point cloud) provides an efficient means for identifying candidate point-pairs for contraction. In this regard, as each of the points within the point cloud will be included within a leaf/external cluster, all of the points will eventually become a representative point of a cluster. Therefore, as there is an edge defined between each representative point and the representative point of it's immediate parent cluster (other than for the representative point of the root cluster), the number of edges in such a logical tree is linearly dependent on number of points in the point cloud. Moreover, such a logical tree provides a path (i.e. a sequence of edges, each of which defines a candidate for contraction) between all points in the point cloud, such that the above described method of point cloud simplification provides that any point cloud could be simplified to a single point by traversing this path. In addition, the tree structure of such a logical tree maintains the relative distance between points in the point cloud, as the closer any two points are in the point cloud the fewer edges (i.e. a shorter sequence of contractions) there will be in the path between the two points in the logical tree. The use of such a logical tree therefore captures simplification bias, whilst also providing good computational performance.

There are a number of methods of recursive spatial partitioning that could be used to generate a cluster hierarchy. For example, k-dimensional (k-d) tree spatial partitioning recursively splits space into two half-spaces by generating a splitting hyperplane that divides a space into two parts. By way of further example, octree tree spatial partitioning recursively subdivides space into eight octants. Whilst the hierarchical clustering of the set of points could be implemented using the known recursive spatial partitioning methods that use a fixed pattern of partitioning, it is preferable to implement a recursive spatial partitioning method that uses a variable pattern of partitioning, thereby giving a high-level of control over the depth of the hierarchy and the number of points in each cluster. In this regard, a fixed pattern of partitioning involves splitting space into a fixed number of sub-spaces at each recurrence, whereas for a variable pattern of partitioning the number of sub-spaces generated can vary at each recurrence When implementing the hierarchical clustering of the points in a point cloud using a computer, it may be preferable that the set of data points that make up the point cloud are placed into an array, effectively defining the initial root cluster. This array can be viewed as left-closed right-open range, i.e. [first, last).

Figure 7:
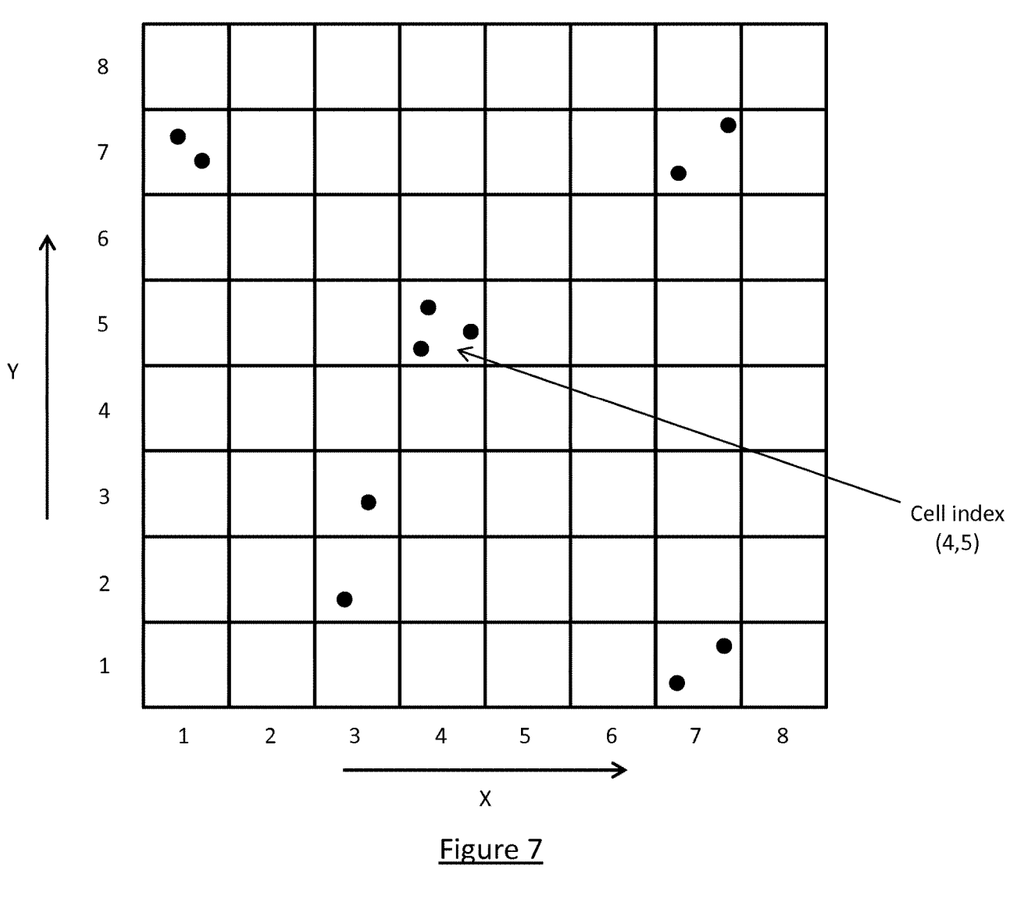
FIG. 7, illustrates an example of a two-dimensional space that has been partitioned into a grid of cells.

Each point in the point cloud will fall into a cell, wherein a cell is aligned on the bounding box encompassing the points in a cluster. By way of example, FIG. 7 illustrates a simple example of a two-dimensional space that has been partitioned into a grid of cells. In this example, the tuple of indices of a cell includes a 2-tuple, wherein the numbers in the 2-tuple index the position of the cell in the x-coordinate and y-coordinate directions respectively. Therefore, within each level of the hierarchy, each point can be mapped to the tuple of indices of the cell in which the point is located, with the cell representing the cluster in which the point has been placed. Clustering can then be achieved by performing an in-place partition of the set of points in the array into groups which fall into the same cell, i.e. which have the same tuple of indices.

For example, this in-place partitioning could be implemented using a comparison-based sorting algorithm such as Introsort, wherein the ordering relationship uses a lexicographical comparison of tuple indices. This results in O(N log(N)) complexity for the clustering of one cell with N points into sub-cells. As an alternative example, the in-place partitioning could be implemented using an integer-based sorting algorithm such as radix sort or counting sort. In this case, the indices in the tuple are mapped to one integer which is then used as sorting key. This results in O(kN) complexity for the clustering of one cell with N points into sub-cells, where k is number of digits used during sorting. For many practical applications k is small and fixed such that complexity then becomes O(N).

Figure 8:
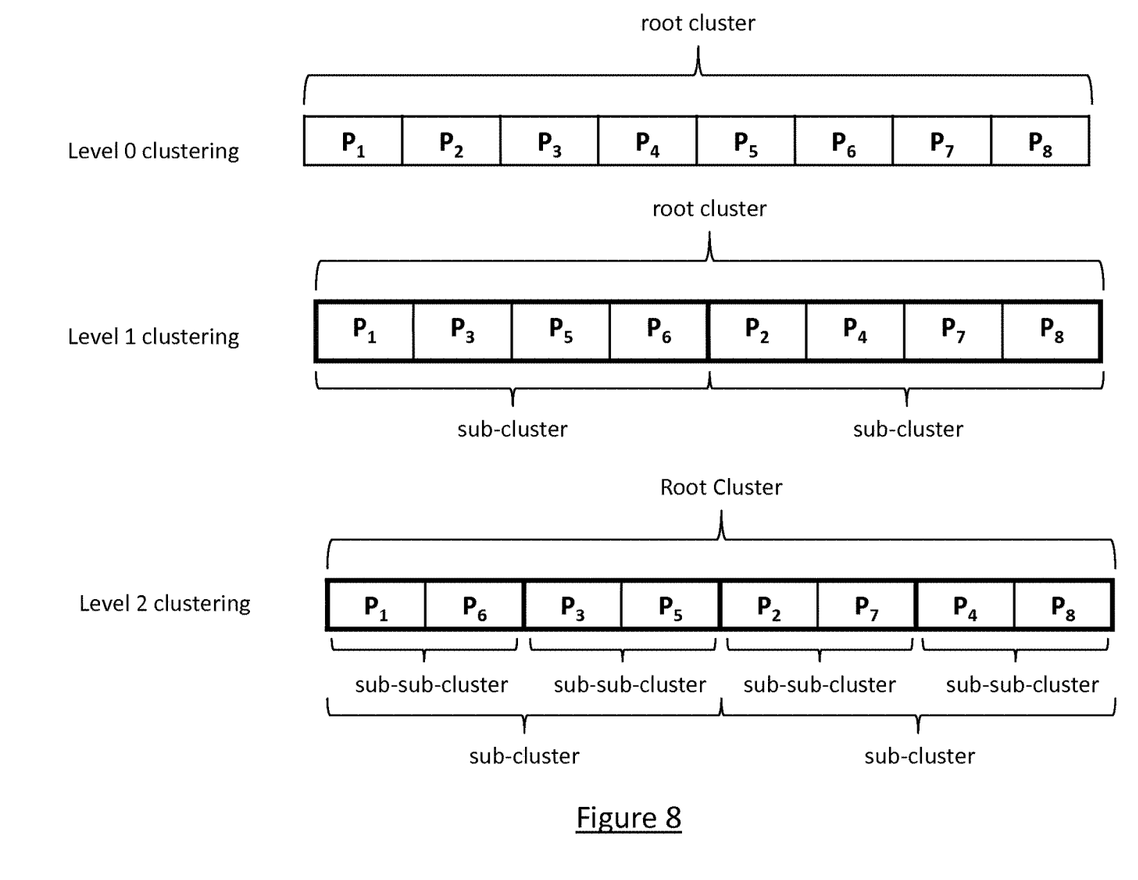
FIG. 8 illustrates schematically the in-place partitioning of a set of points within an array.

The in-place partitioning of the set of points results in the points being grouped into their corresponding clusters within the array. This is illustrated schematically in FIG. 8 for a simple array of eight points (P1 to P8) that has undergone two levels of hierarchical clustering.

The recursive clustering method stops when it is determined that a cluster has only one point, or if a predefined traversal depth level is reached. This results in O(dN) complexity for full hierarchical clustering, where d is depth level and is usually log(N), resulting in O(N log(N)) overall complexity using integer-based sorting. Such a divide-and-conquer hierarchical clustering method exposes an important performance property, in that it is an optimal cache-oblivious algorithm, i.e. it uses the memory/cache hierarchy optimally, in an asymptotic sense. Eventually, during the division of cell size, the cluster will fit fully into the highest level of processor cache (e.g. such as the L3 cache of modern CPUs), which means that all processing of its points, within all of its sub-clusters within hierarchy will happen within that cache level. Moreover, points of deeper levels will fully fit into lower cache levels, such as L2, and so on.

Preferably, the contraction error metric would be a sum of the squared distances between a new, replacement point generated as a result of the contraction and each point in an affiliated set of points arising from the contraction of the point-pair. In this regard, each point can be considered to have an implicit set of affiliated points that includes all of the points of the original point cloud that the point has replaced (i.e. as a result of a contraction of a point-pair). Therefore, in the initial point cloud, the affiliated set of each point includes only the point itself, as no contractions have taken place. For a replacement point that has been generated as the result of the contraction of one or more point-pairs, the affiliated set will include all of the points of the original point cloud that have been contracted to generate that replacement point.

To illustrate this, for a point in a point cloud $P_n$ the affiliated set of the point can be represented as:

Affiliated set of $P_n = P_n$

Similarly, for a replacement point that has been generated as the result of the contraction of a point-pair, the affiliated set of the point can be represented as:

Affiliated set of $P_{n,m} = P_n, P_m$

Therefore, when two points $P_A$ and $P_B$ are contracted, their affiliated sets are merged and the resulting affiliated set is then associated with the replacement point $P_C$ (which is result of the contraction). The computed error of this contraction would therefore be the sum of squared distances between all points in affiliated set and point $P_C$:

$$\text{Error} = \Sigma(P_i - P_C)^2 \qquad \text{Equation 1}$$

where Pi is a point in the affiliated set of point $P_C$ (i.e. the merged affiliated sets of points $P_A$ and $P_B$).

Consequently, the error is initially zero, as the affiliated set of each point includes only itself. Then, as the simplification process proceeds, the error increases as the affiliated sets associated with the points in the simplified point cloud grow with each contraction. In addition, the distances between points can be measured in n-dimensional space, which allows the simplification process to respect additional attributes of the point cloud. By way of example, the coordinate set of each point in the point cloud could include both colour and texture coordinates, such that each point would be represented by a 6-tuple (i.e. x, y, z, r, g, b, u, v). The simplification method can therefore take into account dimensions that are configurable according to application requirements, from pure geometry (x,y,z) to multiple attributes weighted by application-specific factors.

With respect to the contraction error metric given in Equation 1, it has been shown that for the purpose of such an error measure affiliated sets of simplexes (e.g. triangles, line segments, tetrahedrons, and so on) can be maintained implicitly in constant space using the quadric (Q). The contraction error can therefore be approximated using a quadric error metric that will be described further below. The concept of the quadric error metric is also discussed in detail in Michael Garland and Paul S. Heckbert "Surface Simplification Using Quadric Error Metrics", 1997, and Michael Garland and Paul S. Heckbert "Simplifying Surfaces with Color and Texture using Quadric Error Metrics", 1998.

With regards to the quadric error metric, the squared distance ($D^2$) between two points (p and x) can be calculated as:

$$D^2=(p-x)^2=(p-x)^T(p-x)=x^Tx-x^Tp-p^Tx+p^Tp=x^Tx-2x^Tp+p^Tp \qquad \text{Equation 2}$$

whilst the quadric (Q) can be defined as:

$$Q_p(x)=x^TIx-2x^Tp+p^Tp \qquad \text{Equation 3}$$

It can therefore be seen that quadric (Q) defined by equation 3 evaluates to the squared distance between given point x and p, and this quadric (Q) can be stored as tuple of matrix, vector and scalar:

$$Q=(A,b,c)=(I,p,p^Tp) \qquad \text{Equation 4}$$

Moreover, a component wise addition of quadrics can be performed such that:

$$Q_1(x)+Q_2(x)=(Q_1+Q_2)(x) \qquad \text{Equation 5}$$

$$Q_1+Q_2=(A_1+A_2,b_1+b_2,c_1+c_2) \qquad \text{Equation 6}$$

The sum of a plurality of quadrics is therefore another quadric which represents sum of squared distances to each underlying point. In other words, one quadric can be used to represent a set of points, and the addition of two or more quadrics can then represent the union of the sets of points represented by the summed quadrics. Consequently, for a contraction of the point-pair $P_1$-$P_2$, the associated error due to the contraction is the sum of squared distances from the replacement point $P_R$ to affiliated simplexes, which is given by:

$$\text{Contraction Error}=(Q_1+Q_2)(P_R) \qquad \text{Equation 7}$$

If we only use the quadrics of points, then the matrix component A will always be of form nI, and can then be stored as one scalar n. However, in general, quadrics can be used to represent distances to arbitrary simplexes, and such quadrics will have more complicated structure of A matrix (i.e. non-identity). For example, the quadric of a plane can be added to the affiliated sets by a user or extracted automatically by domain specific heuristics. Such a plane can represent useful model features and will bias the simplification process to preserve points around that plane.

In addition, as each point can be represented by a quadric Q, which also represents a set of affiliated points associated with the point (i.e. by summed quadrics), quadrics can also be used to determine the location of the replacement point that is generated as a result of a point-pair contraction. For example, for the point-pair ($P_1$-$P_2$) that is to be contracted, if the replacement point is to be located at the position of whichever one of the points in the point-pair that results in the lowest contraction error metric, then these can be determined using the quadrics of each point (i.e. ($Q_1$+$Q_2$)($P_1$) and ($Q_1$+$Q_2$)($P_2$)) and the results compared to determine which results in the lowest error. Alternatively, if the replacement point is to be located at a position that minimises the contraction error metric for the corresponding contraction, then these can be determined using the quadric to finding the optimal position which minimizes sum of squared distances to affiliated simplexes for which $$Q(x)\text{->min}:x=-A^{-1}b \qquad \text{Equation 8}$$

The iterative contraction of the point-pair with the lowest contraction error metric continues until a predefined stop criteria is met. By way of example, the stop criteria could include one or more of the following:

i. a predefined percentage reduction threshold, wherein the number of points in the set is reduced until this percentage reduction threshold is reached;

ii. a predefined maximum number of points threshold, wherein the number of points in the set is reduced until the number of points in the reduced set is equal to or less than the threshold maximum number of points;

iii. a predefined maximum file size threshold, wherein the number of points in the set is reduced until the (data) size/volume of the reduced set of points is equal to or less than the threshold maximum file size;

iv. a predefined minimum number of contracted points threshold, wherein the number of points in the set is reduced until the number of points that have been contracted is equal to or greater than the threshold minimum number of contracted points;

v. a predefined accuracy or error measure threshold, wherein the number of points in the set is reduced until the accuracy or error measure threshold is reached;

vi. a predefined maximum spatial distance tolerance, where only point pairs that fall within this distance may be contracted, such that the number of points in the set is reduced until no further point pairs can be contracted.

Figure 9:
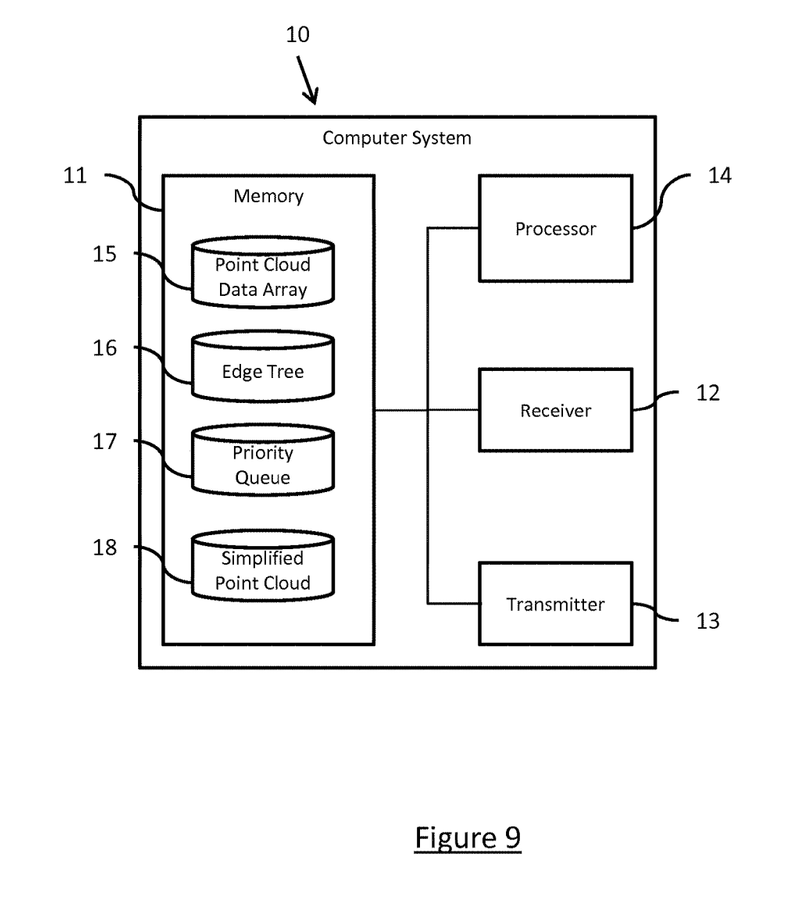
FIG. 9 illustrates schematically an embodiment of a computer system 10 suitable for implementing the methods described herein.

FIG. 9 illustrates schematically an embodiment of a computer system 10 suitable for implementing the methods described herein. The system 10 can be implemented as a combination of computer hardware and software, and includes a memory 11, a receiver 12, a transmitter 13, and a processor 14. Whilst the system 10 has been illustrated schematically as single device (e.g. server or computer) including a single occurrence of each of the functional elements listed above, the system could equally include multiple occurrences of each functional element and could equally be provided by a plurality of separate devices that cooperate to provide the required functionality. By way of example, separate aspects of the functionality of the system could be distributed between a number of separate servers or computer devices, such that a first group of one or more servers/computer devices implements all of the necessary processing and interface functions whilst a second group of one or more servers/computer devices provides database functionality (e.g. including storage, security, data integrity etc).

The memory 11 typically stores the various programs/executable files that are implemented by the processor 14, an array of point cloud data 15, a table defining the edges of a logical tree formed by the point cloud data (i.e. defining the candidate point pairs) 16, a contraction priority queue 17, the resulting simplified point cloud data 18, and any other data that may be of use to the system 10.

The processor 14 is configured to processing requires to implement the simplification of the point cloud data in accordance method for simplification of a point cloud. In particular, the processor 14 is configured to implement recursive spatial partitioning of the set of points into a hierarchy of clusters, to identify representative points within each cluster in the hierarchy, and to define point-pairs that consist of or include a representative point within a cluster and a representative point of an immediate parent cluster. The processor 14 is further configured to calculate a contraction error metric for each point-pair, and to implement the iterative contraction of the point-pair with the lowest contraction error metric, update remaining point-pairs as a result of the contraction, and revise the contraction error metric of the updated point-pairs accordingly. To do so, the processor 14 can implement one or more programs/executable files that has been provided by a computer readable medium storing computer interpretable instructions which when interpreted by the computer system cause the computer to perform the methods described herein.

The point cloud simplification method described herein provides a number of advantages. In particular, the method achieves optimum sample selection minimizing distortions and preserving features which may be lost when using conventional clustering or decimation. The method also provides high performance for large point clouds, achieving O(N*log(N)) scaling with the number of points, and also allows for an arbitrary level of simplification that is not constrained by a lattice. The method requires little control from users through the use of scale-independent parameters.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "including," "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims.

Although the embodiments of the invention described with reference to the drawings include computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier could be any entity or device capable of carrying the program.

For example, the carrier may include a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A computer implemented method for simplification of a point cloud that represents one or more three-dimensional objects or surfaces, the point cloud including a set of points, the method comprising:
   receiving the point cloud and storing the point cloud in a memory;
   implementing, with a processor, recursive spatial partitioning of the set of points into a hierarchy of clusters;
   identifying, with a processor, representative points within each cluster in the hierarchy; and,
   for each representative point, defining a point-pair that includes the representative point and a representative point of an immediate parent cluster, and calculating a contraction error metric for each point-pair; and
   generating, with a processor, a simplified point cloud that represents the one or more three-dimensional objects or surfaces using a reduced number of points by iteratively contracting the point-pair with the lowest contraction error metric, updating remaining point-pairs as a result of the contraction, and revising the contraction error metric of the updated point-pairs accordingly.

2. The method of claim 1, wherein the recursive spatial partitioning of the set of points into a hierarchy of clusters comprises implementing divisive hierarchical clustering of the set of points.

3. The method of claim 1, wherein the recursive spatial partitioning of the set of points into a hierarchy of clusters comprises: partitioning an initial root cluster comprising the set of points into a number of clusters; recursively partitioning each cluster into further clusters until either each cluster contains a single point or a predefined depth is reached.

4. The method of claim 1, wherein the step of identifying representative points within each cluster in the hierarchy comprises:
   for a cluster in the hierarchy that has at least one child cluster, identifying the point that is closest to the mean of the points within the cluster as a representative point; and for a cluster in the hierarchy that has no child cluster, identifying each point within the cluster as a representative point.

5. The method of claim 1, and further comprising:
   generating a logical tree by defining the representative points as nodes of the logical tree, and, for each representative point, defining an edge of the logical tree as a point-pair that consists of the representative point and a representative point of an immediate parent cluster.

6. The method of claim 5, wherein the step of updating remaining point-pairs as a result of the contraction comprises:
   updating the logical tree as a result of the contraction of the point-pair.

7. The method of claim 1, and further comprising:
   defining a contraction queue in which the point-pair with the lowest contraction error metric is first in the contraction queue; and after each contraction, updating the contraction queue to reflect updates in the calculated contraction error metrics of the updated point-pairs.

8. The method of claim 1, wherein the step of updating remaining point-pairs as a result of the contraction comprises:
   identifying other point-pairs that include either of the points that were included in the contracted point-pair, and updating the identified point-pairs to include a new point generated as a result of the contraction.

9. The method of claim 8, wherein the step of revising the contraction error metric of the updated point-pairs accordingly comprises:

for each of the point-pairs that are updated to include a new point generated as a result of the contraction, recalculating the contraction error metric using the new point.

10. The method of claim 1, wherein the iterative contraction of the point-pair with the lowest contraction error metric continues until a predefined stop criteria is met.

11. The method of claim 1, wherein the contraction of the point-pair with the lowest contraction error metric comprises replacing the point-pair with a new point.

12. The method of claim 11, wherein the step of replacing the point-pair with a new point comprises either of:

selecting a position of one of the points in the point-pair that results in the lowest contraction error metric for the corresponding contraction and generating a new point at the selected position; and determining a position that minimises the contraction error metric for the corresponding contraction and generating a new point at the determined position.

13. The method of claim 1, wherein the contraction error metric is a sum of the squared distances between a new point generated as a result of the contraction and each point in an affiliated set of points arising from the contraction of the point-pair.

14. The method of claim 1, wherein the contraction error metric is a quadric error metric.

15. A non-transitory computer readable medium storing computer interpretable instructions which when interpreted by a programmable computer cause the computer to perform a method in accordance claim 1.

16. A computer system for implementing simplification of a point cloud that represents one or more three-dimensional objects or surfaces, the point cloud comprising a set of points, the system comprising:

a memory configured to store the point cloud; and
a processor configured to:
implement recursive spatial partitioning of the set of points into a hierarchy of clusters;
identify representative points within each cluster in the hierarchy and, for each representative point, define a point-pair that includes the representative point and a representative point of an immediate parent cluster; calculate a contraction error metric for each point-pair; and
generate a simplified point cloud that represents the one or more three-dimensional objects or surfaces using a reduced number of points by iteratively contract the point-pair with the lowest contraction error metric, updating remaining point-pairs as a result of the contraction, and revising the contraction error metric of the updated point-pairs accordingly.

* * * * *